Patented Sept. 22, 1931

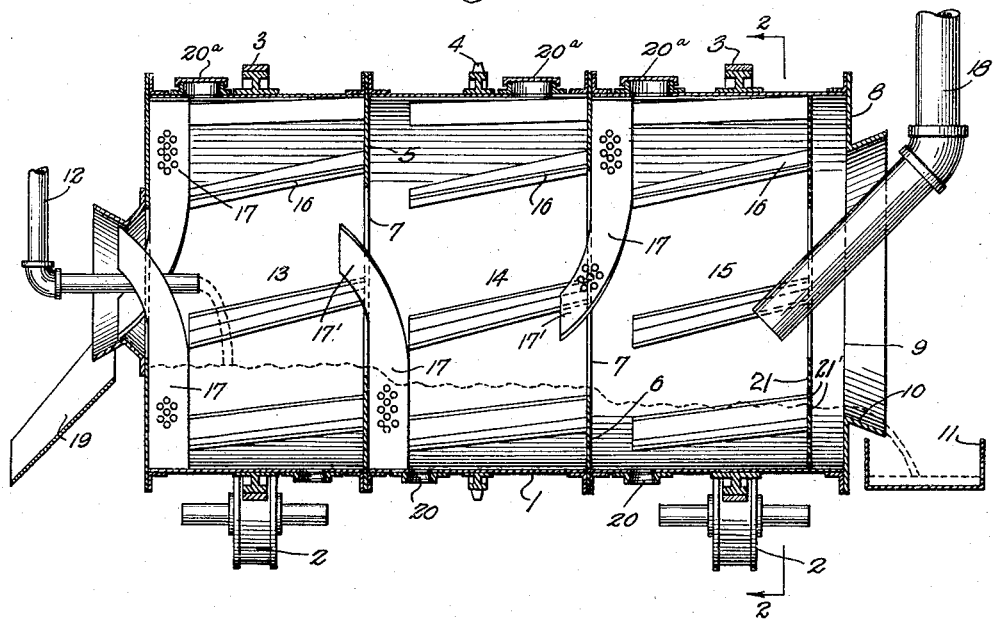

1,824,688

UNITED STATES PATENT OFFICE

RICHARD W. RIGLER, OF PHILADELPHIA, PENNSYLVANIA

WASHER

Application filed January 30, 1930. Serial No. 424,661.

The invention has relation to washers for materials used in industrial processes, such as rubber, pulp, sand, etc., and has for an object certain improvements whereby greater economy of construction and operation will be obtained as will be explained.

The invention consists in the novel construction and combinations of parts as set forth in the appended claims.

In the accompanying drawings illustrating an embodiment of the invention, Figure 1 is a central longitudinal section on the line 1—1, Figure 2; and Figure 2 is a cross section on the line 2—2, Figure 1.

In these drawings, the numeral 1 designates a rotatable drum or tank for the wash liquid, of elongated cylindrical form, having support and rotary bearings upon rollers 2, engaged by annular bands 3 of the tank, the latter being rotated by suitable means (not shown) engaging annular gear 4 of the tank.

This tank is provided with spaced partitions 5 and 6 of annular form, of progressively increasing diameter of orifice or opening 7 and with an annular end wall 8, the orifice or opening 9 of which is also of progressively increasing diameter as related to the openings of said partitions, said annular end wall 8 having a bell mouth 10 for wash liquid discharge purposes into a trough 11.

Wash liquid is introduced into the tank through pipe 12. It will be noted that the tank is divided into a plurality of compartments (three as shown) 13, 14, and 15 by the annular partitions 5 and 6, and that due to the progressively increasing diameters of the openings of the partitions and the opening of the annular end wall 8 of the tank, the wash water introduced by the pipe 12 into the compartment 13 at one end of the tank is allowed to reach a certain level therein when it will overflow into the adjacent or middle compartment 14, wherein it is allowed to reach a certain lower level, when it will overflow into the compartment 15 at the other end of the tank, wherein it is allowed to reach a certain still lower level, when it will overflow into the drain trough 11. The reason for the successively or progressively lower levels of the wash liquid in the several tank compartments is of course due to the progressively increasing diameters of the openings of the annular partitions 5 and 6 and of the end wall 8.

The circumferential wall of the tank is provided in each of the three compartments with an annular series of inwardly extending flanges 16, forming pockets due to the inclination of the flanges as seen in end view, said flanges being also arranged spirally or inclined longitudinally, so as to successively raise material being treated and allow it to drop back into the wash liquid, and to feed the material being washed toward the discharge end of the compartment or towards the scoop that elevates and advances the material as will be explained. Suitably secured to the tank in each compartment thereof is one or more arcuate scoops 17, terminating at its inner end slightly below the level of the center of each compartment as the scoop arrives at the top of the tank in the rotation thereof, the lower end portion of the scoop being extended laterally through the opening of the adjacent annular partition at 17', so that material picked up by each scoop in its rotation with the tank is delivered into the next adjacent compartment and is finally discharged from the end compartment wherein the wash liquid has the highest level. The scoops are perforated to drain the material being washed for obvious reasons.

A feed chute or pipe 18 is provided through which material to be washed is fed, and at the other end of the machine is a discharge spout or chute 19 to receive material discharged from the compartment of the tank at that end thereof. An annular plate 21 having perforations 21', is provided in compartment 15 at the end thereof wherein material to be washed is fed by the pipe 18, and spaced from annular end wall 8 to form a supplemental compartment of slight breadth wherein the flanges 16 do not extend and material to be washed is not fed, this being for the purpose of preventing such material from being carried out of the compartment and tank with the spent liquid or wash water through annular bell mouth or orifice 9 into the drain trough.

Sludge collected in the compartments of the tank may be discharged through pipes or conduits communicating with openings 20 of the tank. Manhole openings may be provided at 20a.

The operation is as follows:—

Wash liquid is fed into the compartment 13 through pipe 12, and after filling this compartment to the level of the breadth of the partition 5, the wash liquid overflows into the compartment 14 to the level of the lesser breadth of the partition 6, overflows into the compartment 15, and after filling the same to the level of the still lesser breadth of the annular end wall 8 of the tank, overflows into the drain trough 11. Material to be washed is fed in through the pipe 18 into the compartment 15, where it is successively raised by the flanges 16 and dropped back into the compartment. As the material accumulates in this compartment it is picked up by the scoop 17 thereof and when raised to the upper portion of the compartment by rotation of the tank slides through the chute formed by the inner end portion of said scoop into the compartment 14 where it is subjected to similar treatment in the wash liquid which in this compartment is less contaminated with the impurities of the material being washed. The material is transferred from the compartment 14 to the compartment 13 in the same way and is therein subjected to the same treatment in the clean incoming wash water. The thoroughly washed material is discharged through discharge spout 19.

Due to the fewer parts and less obstruction greater economy in construction and operation is secured.

I claim:

In a washer, an elongated tank provided with end walls and partitions having orifices of progressively increasing diameters defining a plurality of separate compartments, and adapted to cause progressively lower levels of wash liquid in the compartments, means for introducing wash liquid into the highest level compartment to overflow into the next lower level compartment, means for introducing material to be washed into the lowest level compartment, and means for transferring the material from compartment to compartment; the lowest level compartment having a perforated plate spaced from the adjacent end wall of the tank to provide a supplemental compartment into which material to be washed is not fed and preventing said material from being carried out of the lowest level compartment with the wash liquid, the annular end wall of the lowest level compartment having a bell mouth to facilitate delivery of the wash liquid.

Signed at Philadelphia, in the County of Philadelphia and State of Pennsylvania.

RICHARD W. RIGLER.